United States Patent [19]
Borland et al.

[11] Patent Number: 6,055,810
[45] Date of Patent: May 2, 2000

[54] FEEDBACK CONTROL OF DIRECT INJECTED ENGINES BY USE OF A SMOKE SENSOR

[75] Inventors: Mark S. Borland, Troy; Thomas W. Asmus, Oakland; Frank Zhao, Lake Orion, all of Mich.

[73] Assignee: Chrysler Corporation, Auburn Hills, Mich.

[21] Appl. No.: 09/134,110

[22] Filed: Aug. 14, 1998

[51] Int. Cl.[7] .......................... F02D 23/00; F02M 25/07; F02P 5/15

[52] U.S. Cl. .......................... 60/600; 60/603; 60/605.2; 123/568.21; 123/406.28; 123/703

[58] Field of Search ............................. 60/601, 602, 600, 60/603, 605.2; 123/406.26, 406.27, 406.28, 406.45, 406.48, 357, 703, 568.21, 568.23, 568.24, 568.26, 568.27

[56] References Cited

U.S. PATENT DOCUMENTS

| | | | |
|---|---|---|---|
| 3,851,632 | 12/1974 | Teshirogi et al. | 123/119 A |
| 4,252,098 | 2/1981 | Tomczak et al. | 123/437 |
| 4,485,794 | 12/1984 | Kimberley et al. | 123/569 |
| 4,601,270 | 7/1986 | Kimberley et al. | 123/357 |
| 5,027,768 | 7/1991 | Saegusa | 123/381 |
| 5,044,337 | 9/1991 | Williams | 123/436 |
| 5,215,053 | 6/1993 | Ito | 123/276 |
| 5,425,338 | 6/1995 | Gottemoller | 123/359 |
| 5,778,674 | 7/1998 | Kimura | 60/600 |
| 5,782,092 | 7/1998 | Schultalbers et al. | 60/602 |
| 5,964,199 | 10/1999 | Atago et al. | 123/295 |

*Primary Examiner*—Henry C. Yuen
*Assistant Examiner*—Arnold Castro
*Attorney, Agent, or Firm*—Mark P. Calcaterra

[57] ABSTRACT

A fuel control system for an engine utilizing direct fuel injection including a smoke sensor for measuring the level of smoke in the engine exhaust. A control module, in response to the output signal from the smoke sensor, regulates the timing and delivery of fuel to the engine, the delivery of air to the engine, the amount of exhaust gases that are recirculated to the engine, the turbo boost pressure and performs on-board diagnostics.

15 Claims, 1 Drawing Sheet

FEEDBACK CONTROL OF DIRECT INJECTED ENGINES BY USE OF A SMOKE SENSOR

BACKGROUND OF THE INVENTION

1. Field of the Invention

The present invention relates to engine fuel control systems, and more specifically to the use of a smoke sensor as the basis for the control of the fuel system.

2. Related Art

Engine fuel control systems (FCS) are used not only to control the amount of fuel delivered to the engine for combustion, but also to control the amount of air being delivered to the engine for combustion, the composition of this air if the engine utilizes an exhaust gas recirculation system, the amount of turbo boost pressure if the engine utilizes a turbocharger having a wastegate or variable geometry, and various other emissions and/or performance related functions such as swirl-port deactivation and fuel injector operation.

Fuel control systems for gasoline engines are typically closed-loop in nature, using feedback from a switching-type oxygen sensor disposed within the engine exhaust system as one basis of its control. These fuel control systems have significant shortcomings, however, when incorporated into lean-burn type engines, such as diesel engines, where smoke is more readily produced and is therefor of greater concern. As used herein, the term 'smoke' shall be defined to include particulate matter, black smoke and white smoke. As is known in the art, particulate matter consists of all non-gaseous substances, excluding unbound water, which are normally present in the exhaust gases. Particulate matter from a diesel engine, for example, typically consists of combustion-generated solid carbon particles, commonly referred to as soot, with occluded organic and inorganic compounds such as unburned hydrocarbons, oxygenated hydrocarbons, sulfur dioxide, nitrogen dioxide and sulfuric acid. Visible air-borne particulate matter is commonly referred to as black smoke. White smoke is comprised of highly atomized unburned fuel.

When controlling the fueling of a lean-burn type engine, the fuel control systems used with traditional gasoline engines exhibit significant shortcomings that stem from the fact that oxygen is a poor indicator of the smoke level in the exhaust and that the exhaust typically contains large amounts of oxygen regardless of the performance or emission level of the engine. Transitions from one emission/performance state to another can be accompanied by relatively small changes in the oxygen level of the exhaust. Consequently, a diesel engine fuel control system whose control is based upon the level of oxygen of the exhaust cannot identify the current emission /performance state of the engine with complete accuracy.

Because fuel control systems utilizing O2 sensors have difficulty detecting the onset of an undesired emission/performance state, the transient response of these systems usually includes a significant time lag between the point at which the undesired emission state is identified or predicted and the point at which the corrective action is implemented (e.g. the EGR valve is closed and the air manifold is purged of any intake air containing recirculated exhaust gases). As such, the transient response of a fuel control system whose control is based upon the level of oxygen in the exhaust is extremely poor.

Another drawback of fuel control systems that utilize O2 sensors is that oxygen is not a "direct" indicator of either smoke or NOx. Consequently, in developing the calibration of the fuel control system, a set of assumptions must be made to relate the oxygen level to the levels of smoke and NOx. As many of the variables which contribute to the production of smoke and NOx are not directly monitored by the engine, a relationship must be derived associating the effects of these variables on the level of oxygen in the exhaust. Where no relationship between a variable and the amount of oxygen is found to exist, the "worst-case" effects of the variable are factored into the FCS calibration.

Many of these variables are the result of part-to-part variations stemming from ordinary design issues, manufacturing and machining tolerances or wear. Some of these variables can effect the performance and operation of the engine as a whole, such as differences in the output of a fuel pump, fuel injector, or turbocharger. Other variables are apparent only when differences in cylinder-to-cylinder emissions and performance are analyzed. These variables include, for example, differences in the output of fuel injectors, pressure drops across the length of the air manifold, volumetric differences between the cylinders, and timing differences between the opening of the valves.

Although these assumptions are necessary to ensure that desired emissions levels are maintained, they have several drawbacks. Due to the multitude of variables involved, the effort to calibrate the fuel control system is immense, consisting of the identification of each variable, an analysis of the impact of the variable on the performance and emissions output of the engine and an analysis of the best way to incorporate the effects of the variable into the calibration of the fuel control system.

The resulting calibration is a compromise between the competing interests of performance and emissions output, with the emphasis being placed on maintaining emission levels within desired limits. As many of the variables cannot be directly monitored or have no direct relationship with the level of oxygen in the exhaust gases, performance is sacrificed, not only because the characteristics of the engine will likely deviate from the "worst-case" scenario used to develop the calibration, but also because a margin of safety is incorporated into the calibration which sacrifices performance in order to ensure that the emissions output is maintained below desired limits.

Although a fuel control system using closed-loop feedback control based on the level of oxygen in the engine exhaust is technologically possible (e.g. wide-range type oxygen sensors) and although these systems are generally capable of providing better overall control than the presently used open-loop controls, such systems have not received commercial acceptance due to the additional cost associated with such systems. As such, the fuel control systems for diesel engines are typically operated on an open-loop basis. These open-loop systems have limited means for making changes in response to the actual emissions/performance of the engine in both the manner and amount of fuel and air that is being delivered to the engine for combustion. The ability to detect or monitor certain parameters typically requires additional sensors. For example, a barometer sensor is frequently incorporated into the prior art open-loop fuel control systems to allow for compensation for variations in the ambient air pressure caused by changes in the weather and/or by the altitude at which the engine is being operated. These pressure changes have a proportional effect on the air-to-fuel ratio being delivered to the engine and as such, compensation is necessary to ensure that the desired mass flow of air is being delivered to the engine for combustion. Additional sensors could be included to monitor a multitude of various characteristics that effect the emissions and performance of an engine, but this would increase both the cost and complexity of the fuel control system without providing the ability to optimize the engine performance while maintaining emissions outputs within desired levels. These open-loop systems have a very limited capability to perform on-board diagnostics to identify instances where the emissions output of the engine exceeds a predetermined level and/or malfunctioning equipment impacting the emissions/performance of the engine.

Therefore, there remains a need in the art for a fuel control system for a lean-burn engine that operates with closed-loop feedback to regulate the amount of air and the amount and timing of fuel delivered to the engine for combustion to improve performance, reduce emissions and provide improved on-board diagnostics for equipment critical for the control and monitoring of the engine exhaust emissions.

The present invention provides a fuel control system using closed-loop feedback control based on the level of smoke in the engine exhaust. Closed-loop feedback control allows various aspects of the delivery of air and fuel to the engine for combustion to be tailored to the characteristics of an individual engine allowing performance to be optimized while maintaining emissions within desired limits.

BRIEF SUMMARY OF THE INVENTION

It is therefore an object of the present invention to provide a smoke sensor for use in an engine exhaust system to monitor the level of smoke being produced by the engine.

It is another object of the present invention to provide a fuel control system for regulating the amount of air and fuel being delivered to the engine for combustion, wherein the fuel control system is operated in a closed-loop feedback manner and having its control based upon the output signal from a smoke sensor.

It is a further object of the present invention to provide a fuel control system operated in a closed-loop feedback manner having its control based on the level of smoke in the exhaust to regulate the amount of exhaust gases being recirculated to the engine.

It is another object of the present invention to provide a fuel control system operated in a closed-loop feedback manner whose control is based on the level of smoke in the exhaust to monitor the effectiveness of swirl porting and deactivate it.

Another object of the present invention is to provide a fuel control system with on-board diagnostic capabilities that is operated in a closed-loop feedback manner and whose control is based on the level of smoke in the exhaust.

According to the preferred embodiment, the fuel control system of the present invention includes a smoke sensor for measuring the level of smoke in the engine exhaust, a control module which, in response to the output signal from the smoke sensor, regulates the air-to-fuel ratio delivered to the engine, regulates the amount of exhaust gas recirculated to an engine, regulates the turbo boost pressure and performs on-board diagnostics.

DETAILED DESCRIPTION OF THE DRAWINGS

Figure 1:
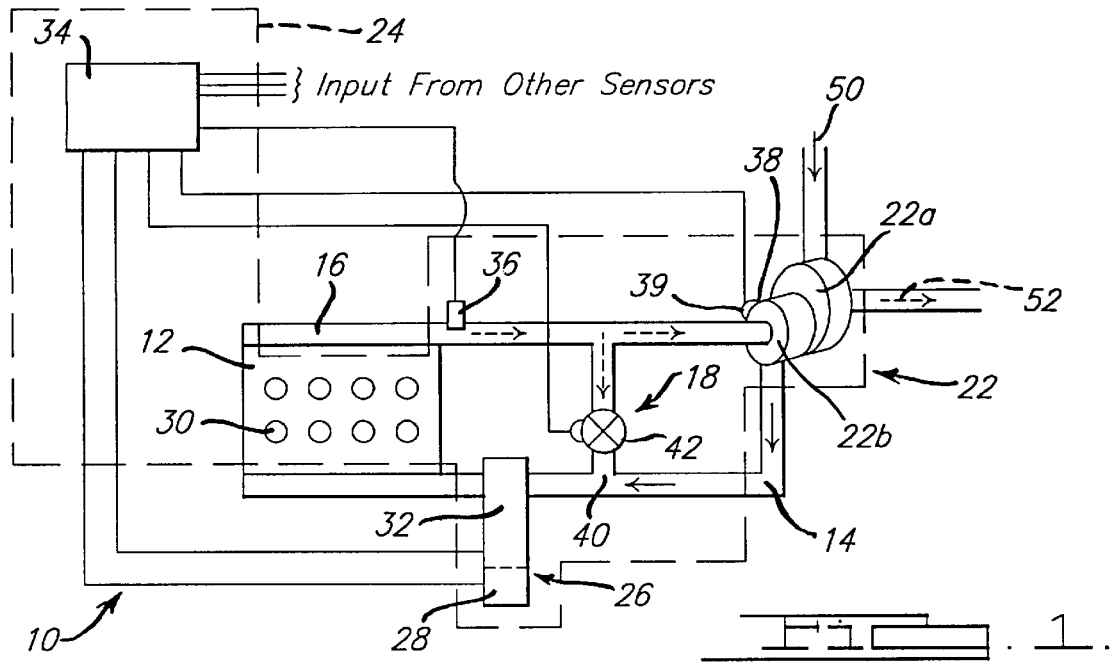
FIG. 1 is a schematic view of a diesel engine incorporating the fuel control system of the present invention.

FIG. 1 is a schematic view showing the present invention incorporated into a diesel engine. It will be understood, however, that the reference to a diesel engine is merely exemplary and that the teachings of the present invention are applicable to other types of engines. The diesel engine 10 includes a cylinder block 12, an air intake system 14, an exhaust system 16 and a fuel control system 24. The fuel control system 24 is comprised of an exhaust gas recirculation system 18, a turbocharger 22, air-to-fuel ratio (A/F ratio) regulation means 26 which includes fuel regulation means 28, including fuel injectors 30, for regulating the delivery of fuel to the cylinder block 12 and air regulation means 32 for regulating the delivery of air to the cylinder block 12. As used hereinafter, regulation of the A/F ratio will be understood to include regulation of the timing of the delivery of fuel to the engine, regulation of the amount of fuel delivered to the engine and/or regulation of the amount of air delivered to the engine for combustion. The fuel control system 24 also includes an engine control module 34 and a smoke sensor 36 placed within the exhaust system 16 for sensing the level of one or more of the components of smoke in the engine exhaust and generating a signal in response to this level.

Fresh air 50 drawn into the air intake system 14 is routed through the compressor side 22a of the turbocharger 22. When the turbocharger 22 is operating, the fresh air 50 passing through it is compressed so that the air exits the turbocharger 22 at an elevated pressure. The differential pressure between ambient air and the air exiting the turbocharger 22 is called the turbo boost pressure. Excess turbo boost pressure generally does not adversely effect emissions output but can have a detrimental effect on both fuel economy and engine durability. Insufficient turbo boost pressure, on the other hand, has a detrimental effect on performance and/or emissions output. Turbo boost pressure can be altered through the use of a wastegate 38 or variable geometry as explained below. Air exiting the turbocharger 22 flows to a junction 40 where exhaust gases 52 are recirculated to the engine. The fresh air 50 and exhaust gases 52 combine and are routed into the cylinder block 12 for combustion.

The fuel control system 24 is used to regulate the A/F ratio being delivered to the cylinder block 12 for combustion. As is well known in the art, there are numerous means for regulating the A/F ratio, including valves for regulating the amount and flow of intake air and solenoids for regulating the amount of fuel output and the timing of the operation of the fuel injectors. The fuel control system 24 also regulates the amount of exhaust gases to be recirculated to the cylinder block 12, regulates the turbo boost pressure, performs on-board diagnostics to identify instances where emissions have exceeded a predetermined threshold and to identify engine malfunctions, and controls various emissions and/or performance related functions, such as swirl-port deactivation and fuel injector operation. As is known in the art, swirl-porting is a technique employed at low engine speeds whereby the flow of air entering a cylinder is caused to take on a more turbulent characteristic in order to improve emissions and/or performance. Control of the system 24 is based upon the output from a multitude of sensors including a smoke sensor 36. Although the smoke sensor 36 could be positioned anywhere along the length of the exhaust system 16, it is preferred that the smoke sensor 36 be placed upstream the turbocharger 22 so as to maximize accuracy and shorten the response time.

Exhaust gases 52 created by the combustion of the fuel are directed away from the cylinder block 12 by the exhaust system 16. An exhaust gas recirculation (EGR) system 18 is disposed between the exhaust system 16 and air intake system 14. A valve 42 in the EGR system 18 is used to regulate the amount of exhaust gases 52 that are being recirculated to the cylinder block 12.

Exhaust gases 52 not recirculated are directed toward the turbine side 22b of the turbocharger 22. Energy from the exhaust gases 52 is used to compress incoming fresh air 50. In turbocharger 26 having a wastegate 38, the fuel control system 24 regulates the turbo boost pressure by controlling an actuator 39 which opens the wastegate 38 and allows the exhaust gases 52, either in whole or partially, to bypass the turbine side 22b of the turbocharger 22. Another means for obtaining a variable level of turbo boost pressure is through the use of a variable geometry turbocharger (VGT), which is well known in the art. The vanes of a VGT are movable and can be adjusted by the fuel control system 24 to provide varying levels of turbo boost pressure.

In contrast to an open-loop fuel control system or a closed-loop fuel control system whose control is based upon the output from an O2 or NOx sensor, control of the fuel control system 24 of the present invention is based upon directly measured smoke levels. Direct smoke measurement allows the fuel control system 24 to analyze variables which could not be monitored and/or compensated for by prior art fuel control systems.

Part-to-part variations which effect the performance/emissions output of an engine on a cylinder-to-cylinder basis can be identified through direct smoke level monitoring. Output from a high speed smoke sensor can be used to analyze the composition of the exhaust from individual cylinders, allowing the fuel control system 24 to evaluate the composite effect of the multitude of variables that affect the emissions and performance of a particular cylinder. Compensation for the variables affecting the emissions and performance of an individual cylinder can then be made without the need to identify the effects of each particular variable. These variables affect almost all aspects of the delivery of fuel and air to the engine for combustion and result from design limitations, manufacturing and machining tolerances and wear. Examples of these variables include pressure drops over the length of a manifold, injector output, and the timing of the valve operation. Examples of fuel control system compensation include changes to the A/F ratio and advancing or retarding the time at which the fuel is introduced.

Although a high-speed smoke sensor is preferred, a slower speed sensor could also be favorably used. While the slower speed sensor would not allow the fuel control system to make a composite analysis of the individual cylinders, the cylinder-to-cylinder variations could be averaged across the cylinders and corrective action could be implemented on a composite basis. Both methods allow for compensation of part-to-part variations which effect the engine performance/emissions generally. These variations include fuel pump flow and timing; turbocharger flow; intercooler flow and cooling capacity; EGR valve response and flow rate changes; injector variation due to manufacturing, drift and wear; and the properties of the fuel.

Since direct smoke level monitoring allows the fuel control system to adapt to both the unique characteristics of an individual engine and the present operating conditions, assumptions made for purposes of calibrating the fuel control system which relate to the unmonitored engine-to-engine and cylinder-to-cylinder variations are no longer needed. Consequently, the effort required to calibrate the fuel control system 24 is substantially reduced, the performance of the fuel control system is enhanced and the performance of engine 10 is improved.

Figure 2:
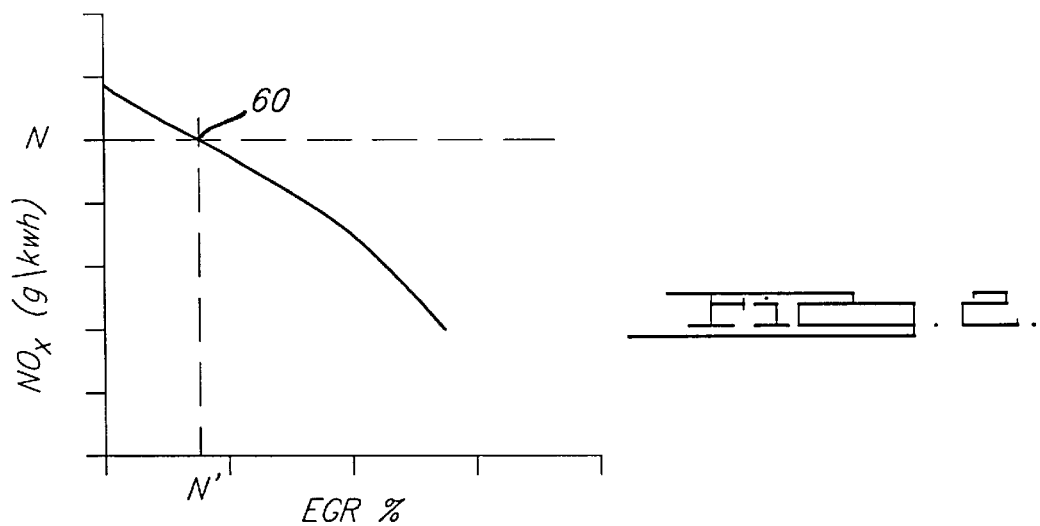
FIG. 2 is a plot showing the relationship of NOx to % EGR.
Figure 3:
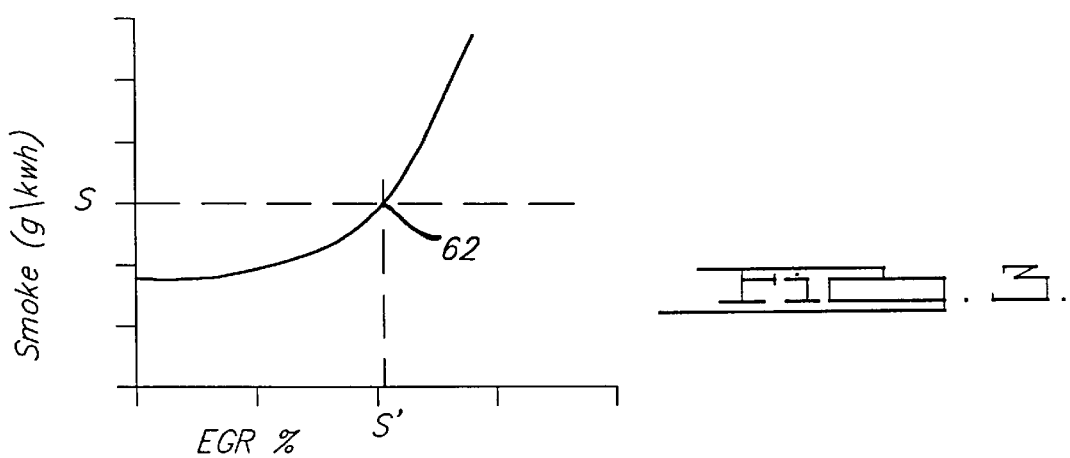
FIG. 3 is a plot showing the relationship of smoke level to % EGR.

Another important advantage of direct smoke level monitoring is the ability to improve the responsiveness of the fuel control system 24. FIGS. 2 and 3 show the relative levels of NOx and smoke as a function of the amount of exhaust gas that is being recirculated.

In FIG. 2, the level of NOx is plotted as a function of the amount of exhaust gas that is being recirculated to the engine. The maximum desired level of NOx is indicated by a horizontal line running though point N. The point at which the NOx curve crosses this maximum level is marked 60 and corresponds to an EGR level of N'. EGR levels below N' will result in the production of NOx in levels which exceed desired limits.

Similarly, in FIG. 3, the level of smoke is plotted as a function of the amount of exhaust gas that is being recirculated to the engine. The maximum desired level of smoke is indicated by a horizontal line running though point S. The point at which the smoke curve crosses this maximum level is marked 62 and corresponds to an EGR level of S'. EGR levels above S' will result in the production of smoke in levels which exceed desired limits. By directly monitoring the level of smoke, the FCS can control the engine such that it produces a desired level of smoke, thereby ensuring that NOx emissions are minimized under a predetermined smoke level constraint.

As relatively small changes in the level of smoke being generated can be used to cause a response from the FCS, corrective action can be undertaken at an earlier point in time, shortening the time required for implementation of the corrective action, also known as the transient response time. For example, the appropriate corrective action for a given set of conditions may entail reducing the amount of exhaust gases that are being recirculated to the engine. Because direct smoke monitoring allows for earlier detection of this condition, the transient response time or overall time required to purge the excess exhaust gases and change the composition of the gases in the intake system is shortened. Similar advantages accrue with regard to turbo boost pressure where the fuel control system 24 controls the operation of the turbocharger wastegate 38 or variable geometry (not shown).

Direct smoke level monitoring also allows the various emissions and performance related functions to be controlled with greater accuracy. For example, a swirl-porting function, as known in the art, is typically employed at low engine speeds to cause the flow of air entering a cylinder to take on a more turbulent characteristic in order to improve emissions and/or performance. In engines having more than one intake valve, a common method for creating additional turbulence in the flow of air entering a cylinder is to inhibit the actuation of one of the intake valves, causing the air entering the cylinder to "swirl" around the interior of the cylinder. As the output of emissions is adversely affected by swirl-porting at higher engine speeds, the prior art fuel control systems typically deactivated this function at a predetermined engine speed. The fuel control system of the present invention, however, allows deactivation of this function at the point at which it begins to impair performance or emissions output, rather than at a predetermined engine speed.

Direct smoke level monitoring also allows on-board diagnostics to be incorporated into the fuel control system 24.

The on-board diagnostics can be used to identify events where excess levels of smoke are generated as well as to help identify malfunctioning systems or components when changes to the smoke level do not occur as predicted.

The improved accuracy of smoke level monitoring, coupled with the decreased transient response time and enhanced operation of the various emissions and performance related functions eliminates the need for significant safety margins in the calibration of the fuel control system 24. This allows the fuel control system 24 to be calibrated in a more aggressive manner, maximizing performance while maintaining emissions output within desired levels.

Another advantage of the present invention includes the ability to eliminate a barometer sensor from the engine. Using direct smoke monitoring for closed-loop feedback control, the fuel control system 24 can analyze the smoke level of the exhaust gases to determine whether adjustments need to be made to the A/F ratio. Consequently, the need for measuring ambient air pressure is eliminated.

While it will be apparent that the preferred embodiments of the invention disclosed are well calculated to provide the advantages and features above stated, it will be appreciated that the invention is susceptible to modification, variation, and change without departing from the proper scope or fair meaning of the subjoined claims.

We claim:

1. A fuel control system for an engine coupled to an air intake system and an exhaust system, wherein said air intake system delivers air to said engine for combustion and said exhaust system directs engine exhaust away from said engine, said fuel control system comprising:
   a smoke sensor disposed within said exhaust system for monitoring a level of smoke in said engine exhaust and producing a smoke signal in response thereto;
   means for regulating an air-to-fuel ratio delivered to said engine; and
   a control module receiving said smoke sensor signal and controlling said regulating means in direct response thereto to cause said engine to produce a predetermined level of smoke.

2. The fuel control system of claim 1 wherein said means further comprises an actuator operably coupled to said control module, said control module controls actuation of said actuator in response to an output signal from said smoke signal.

3. The fuel control system of claim 1, wherein said fuel control system further comprises an exhaust gas recirculation system disposed between said exhaust system and said intake system, said exhaust gas recirculation system having means for regulating an amount of exhaust gas being recirculated to said engine, said means including an actuator controlled by said control module in response to the output signal of said smoke sensor.

4. The fuel control system of claim 1, wherein said control module controls a swirl-port deactivation function of said air intake system in response to said smoke sensor signal.

5. The fuel control system of claim 1, wherein said control module determines when said smoke level in said engine exhaust exceeds a predetermined threshold in response to said smoke sensor signal.

6. The engine of claim 5, wherein said control module determines that malfunctions exist within said engine when the level of smoke in said engine exhaust exceeds said predetermined threshold.

7. The fuel control system of claim 1, wherein said fuel control system further comprises a turbocharger disposed between said exhaust system and said air intake system and means for regulating an amount of boost pressure developed by said turbocharger, said means including an actuator controlled by said control module in response to an output signal from said smoke sensor.

8. The fuel control system of claim 7, wherein said means for regulating the amount of boost pressure developed by said turbocharger is a wastegate.

9. The fuel control system of claim 7, wherein said means for regulating the amount of boost pressure developed by said turbocharger is variable turbine geometry.

10. An apparatus comprising:
    an engine;
    an air intake system delivering air to said engine for combustion;
    an exhaust system directing exhaust gases away from said engine;
    an exhaust gas recirculation system disposed between said exhaust system and said intake system, said exhaust gas recirculation system having means for regulating an amount of exhaust gases being recirculated to said engine, said exhaust gas recirculation regulation means including an actuator; and
    a fuel control system, said fuel control system including:
    a smoke sensor disposed within said exhaust system for monitoring a level of smoke in said engine exhaust and producing a smoke signal in response thereto;
    means for regulating an air-to-fuel ratio delivered to said engine for combustion, said fuel delivery regulation means including an actuator; and
    a control module coupled to said smoke sensor, said exhaust gas recirculation regulation means and said air-to-fuel regulation means, said control module receiving said smoke sensor signal and controlling said exhaust gas recirculation regulation means and said air-to-fuel regulation means in direct response thereto to cause said engine to produce a predetermined level of smoke.

11. The apparatus of claim 10, wherein said control module determines when the level of smoke in the engine exhaust exceeds a predetermined threshold in response to said smoke sensor signal.

12. The apparatus of claim 11, wherein said control module determines that malfunctions within said engine when the level of smoke in said engine exhaust exceeds said predetermined threshold.

13. The apparatus of claim 11 further comprising a turbocharger disposed between said exhaust system and said air intake system and means for regulating an amount of boost pressure developed by said turbocharger, said means including an actuator controlled by said control module in response to said smoke sensor signal.

14. The apparatus of claim 13, wherein said means for regulating the amount of boost pressure developed by said turbocharger is a wastegate.

15. The apparatus of claim 13, whereby said means for regulating the amount of boost pressure developed by said turbocharger is variable turbine geometry.

* * * * *